United States Patent
Buck et al.

(10) Patent No.: US 9,562,815 B2
(45) Date of Patent: Feb. 7, 2017

(54) METHOD FOR COMPENSATION OF FIBER OPTIC MEASUREMENT SYSTEMS AND FIBER OPTIC MEASUREMENT SYSTEM

(71) Applicant: Technische Universität München, Munich (DE)

(72) Inventors: Thorbjörn Buck, München (DE); Lars Hoffmann, München (DE); Mathias Müller, München (DE); Rolf Wojtech, München (DE)

(73) Assignee: Technische Universität München, Munich (DE)

( * ) Notice: Subject to any disclaimer, the term of this patent is extended or adjusted under 35 U.S.C. 154(b) by 57 days.

(21) Appl. No.: 14/405,657

(22) PCT Filed: Jun. 4, 2013

(86) PCT No.: PCT/EP2013/061503
§ 371 (c)(1),
(2) Date: Dec. 4, 2014

(87) PCT Pub. No.: WO2013/182570
PCT Pub. Date: Dec. 12, 2013

(65) Prior Publication Data
US 2015/0144773 A1    May 28, 2015

(30) Foreign Application Priority Data

Jun. 5, 2012 (DE) .......... 10 2012 104 877

(51) Int. Cl.
*G01L 1/24* (2006.01)
*G01L 1/26* (2006.01)

(52) U.S. Cl.
CPC ....... *G01L 1/246* (2013.01); *G01L 1/26* (2013.01)

(58) Field of Classification Search
CPC .................. G01L 1/246; G01L 1/26
See application file for complete search history.

(56) References Cited

U.S. PATENT DOCUMENTS 6,525,308 B1 * 2/2003 Schmidt-Hattenberger  G01J 9/02
                                                      250/227.18
2003/0141440 A1   7/2003 Kim et al.
(Continued)

FOREIGN PATENT DOCUMENTS

CN     101251427 A    8/2008
GB       2407377 A    4/2005
(Continued)

OTHER PUBLICATIONS

H.J Patrick et al Hybrid Fiber Bragg Grating/Long Period Fiber Grating Sensor for Strain/Temperature Discrimination. IEEE PhotonicsTechnology Letters, vol. 8, No. 9, 1996, p. 1223-1225.
(Continued)

*Primary Examiner* — Tony Ko
(74) *Attorney, Agent, or Firm* — Moser Taboada

(57) ABSTRACT

The present invention relates to a method for compensation, for example, for temperature compensation of a fiber optic measurement system designed for determining a mechanical quantity. First and second fiber Bragg gratings have a respective Bragg wavelength, wherein the fiber Bragg gratings are irradiated with primary light. After applying a mechanical quantity to the first and second fiber Bragg gratings, the Bragg wavelengths of the fiber Bragg gratings are changed by the mechanical quantity. Filtering of the first and second secondary light, said first and second secondary light is effected from the primary light and modified by the Bragg wavelength of the fiber Bragg grating depending on the mechanical quantity by use of an optical filter device follows, in such a way that the Bragg wavelength of the first fiber Bragg grating lies in the region of the rising filter gradient of the optical filter device and the Bragg wavelength of the second fiber Bragg grating lies in the region of the falling filter gradient of the optical filter device. After determining the intensities of the filtered first and second
(Continued)

secondary light, they are compared, whereupon the mechanical quantity is determined from the intensity comparison.

15 Claims, 6 Drawing Sheets

(56) References Cited

U.S. PATENT DOCUMENTS

2004/0113055 A1    6/2004   Whelan et al.
2007/0003285 A1    1/2007   Meyer et al.

FOREIGN PATENT DOCUMENTS

GB          2443575 A    5/2008
WO     WO02090893 A1    11/2002

OTHER PUBLICATIONS

International Search Report and IPRP dated Oct. 31, 2013 for PCT/EP2013/061503, 9 pages.

\* cited by examiner

METHOD FOR COMPENSATION OF FIBER OPTIC MEASUREMENT SYSTEMS AND FIBER OPTIC MEASUREMENT SYSTEM

FIELD OF THE INVENTION

The present application relates generally to an optical measurement apparatus for determining measurement quantities by use of sensors embedded in optical fibers, and particularly relates to a method for compensation in fiber optic measurement systems. Further, the present application relates to a fiber optic measurement system for performing a compensation method.

STATE OF THE ART

In high precision measurement systems, fiber optic sensors are becoming increasingly important. Here, one of more sensors embedded in optical fibers, for example, fiber Bragg gratings, is used to determine the elongation of the optic fiber caused by mechanical quantities, and hence to detect the forces, moments, stress, pressure conditions etc.

The sensor elements integrated in fiber sensors are irradiated with a light beam with a suitable wavelength, wherein depending on the design of the sensor element and the mechanical quantity applied to the sensor element, a portion of the irradiated light is reflected from the sensor and may be directed to an evaluation and analysis unit. Through the applied load, the optical fiber is lengthened, and a reflection or transmission wavelength of the fiber Bragg grating is changed. This change in wavelength may be analyzed in the analysis unit, and is used for the detection of mechanical effects on the sensor element.

The intensity and/or the wavelength range of the light beam reflected by the sensor element, or the light beam transmitted through the sensor element, have properties which are influenced by the applied mechanical quantity. The sensor elements integrated into the optical sensor fiber are, amongst others, sensitive to elongation of the sensor fiber, whereby the wavelength spectrum reflected by the sensor element or transmitted through the sensor element is affected.

Elongation of the optic fiber, and subsequently the optical sensor element in the fiber and/or changes in the fiber Bragg grating structure, is hence dependent on not only the mechanical quantity to be measured, for example the force, but also may be influenced by unwanted disturbances, such as temperature fluctuations. It is hence desirable to eliminate, or at least suppress, the disturbances which have an effect on the measurement accuracy.

SUMMARY OF THE INVENTION

The present invention provides a method for compensation of fiber optic measurement apparatus according to claim 1. Further, the present invention provides a temperature-compensated fiber optic measurement apparatus with the properties of independent claim 5.

According to one embodiment, the present invention provides a method for compensation, for example temperature compensation, of a fiber optic measurement system designed to determine a mechanical quantity, including providing, in the fiber optic measurement system, a first and at least a second fiber Bragg grating, which have a respective Bragg wavelength; irradiating the fiber Bragg grating with primary light; applying a mechanical quantity to the first and second fiber Bragg gratings such that the Bragg wavelength of the fiber Bragg grating is changed by the mechanical quantity; filtering the first and second secondary light, said first and second secondary light is effected from the primary light and modified by the Bragg wavelength of the fiber Bragg grating depending on the mechanical quantity, by use of an optical filter device with a rising and a falling filter gradient, by the use of an optical filter device with a rising and a falling filter gradient, wherein the Bragg wavelength of the first fiber Bragg grating lies in the region of a rising filter gradient of the optical filter device, and the Bragg wavelength of the second fiber Bragg grating lies in the region of a falling filter gradient of the optical filter device; determining the intensities of the filtered first and second secondary light; evaluating the determined intensities of the filtered first and second secondary light; and determining the mechanical quantity from the intensity evaluation.

According to a further embodiment, the present invention provides a fiber optic measurement system for determining a mechanical quantity, including a first and at least a second fiber Bragg grating, which have a respective Bragg wavelength dependent on the applied mechanical quantity; a primary light source for irradiating the fiber Bragg grating with primary light; an optical filter device for filtering the first and second secondary light outputted from the first and second fiber Bragg gratings, said secondary light resulting from modification of the Bragg wavelength of the provided primary light, wherein the optical filter device has at least one rising filter gradient and at least one falling filter gradient, and wherein the Bragg wavelength of the first fiber Bragg grating lies in the region of rising filter gradient of the optical filter device and the Bragg wavelength of the second fiber Bragg grating lies in the region of falling filter gradient of the optical filter device; and an optical detection device for determining the intensities of the filtered first and second secondary light; and an evaluation unit for evaluating the determined intensities of the filtered first and second secondary light and for determining the mechanical quantity from the intensity comparison.

BRIEF DESCRIPTION OF THE DRAWINGS

Exemplary embodiments are illustrated in the drawings and explained in detail in the following description. In the drawings.

In the drawings, identical reference numbers describe identical or functionally identical components or steps.

DETAILED DESCRIPTION OF THE INVENTION

Figure 1:
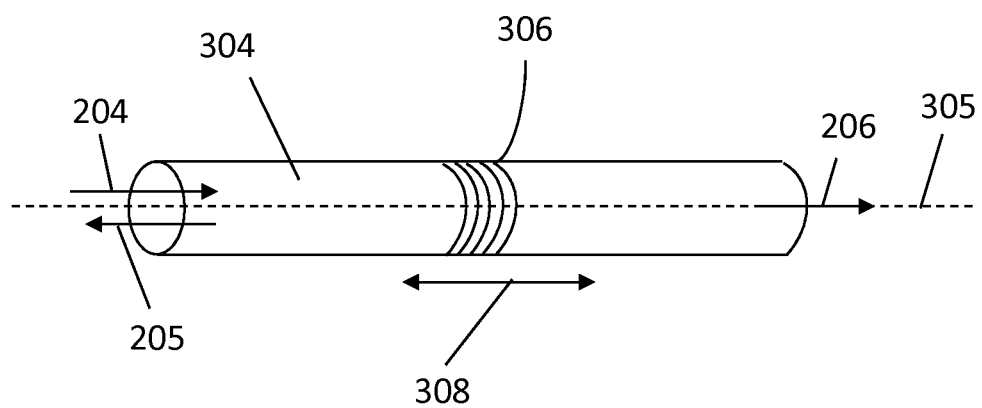
FIG. 1 shows a sensor fiber, comprising an integrated sensor element, designed as a fiber Bragg grating, for measurement of a fiber elongation.

In the following, detailed reference is made to various embodiments of the invention, wherein one or more examples are illustrated in the drawings.

Embodiments of the present invention described herein relate to, among others, a method for compensation, for example for temperature compensation, of a fiber optic measurement system designed to determine a mechanical quantity. In said fiber optic measurement system, a first and at least a second fiber Bragg grating are provided, each having a respective Bragg wavelength. The fiber Bragg gratings are irradiated with primary light with a mechanical quantity applied, such that the Bragg wavelength of the fiber Bragg grating is changed by the mechanical quantity.

After filtering the first and second secondary light, said secondary light resulting from modification of the Bragg wavelength of the provided primary light depending on the mechanical quantity acting on the fiber Bragg grating, by use of an optical filter device, the intensities of the filtered first and second secondary light are determined. The filter device provided for filtering has at least one rising and one falling filter gradient, wherein the Bragg wavelength of the first fiber Bragg grating lies in the region of rising filter gradient of the optical filter, and wherein the Bragg wavelength of the second fiber Bragg grating lies in the region of falling filter gradient of the optical filter. The mechanical quantity is determinable from the intensities determined after filtering, that is the intensities of the filtered first and second secondary light. The intensities may be summated mathematically or through detection, an average may be calculated, wherein a weighting can be applied if necessary. From an intensity comparison, or an intensity evaluation, of the intensities of the filtered first and second secondary light, a compensation quantity can be determined, wherein said compensation quantity is provided for determining the mechanical quantity.

According to typical embodiments, a summation of the intensities may thereby be generated, so that a spectral sum signal of the at least two sensors is filtered through a rising and a falling filter gradient, and the signal is directed to a detector of the optical detector unit. Here, the summation of the intensities occurs through superposition of the intensities.

One embodiment of a temperature-compensated fiber optic measurement apparatus for determining mechanical quantities has a first and at least a second fiber Bragg grating, which have a respective Bragg wavelength dependent on the applied mechanical quantity. A primary light source serves to irradiate the fiber Bragg gratings with primary light. An optical filter device serves to filter the first and second secondary light outputted from the first and second fiber Bragg gratings, said secondary light resulting from modification of the Bragg wavelength of the provided primary light, wherein the optical filter device has at least one rising filter gradient and at least one falling filter gradient. The gradients may be provided by one optical filter, used in transmission and reflection, or by two optical filters.

Further, the fiber optic measurement apparatus is designed in such a way, that the Bragg wavelength of the first fiber Bragg grating lies in the region of rising filter gradient of the optical filter device, and the Bragg wavelength of the second fiber Bragg grating lies in the region of falling filter gradient of the optical filter device. An optical detection device for determining the intensity of the filtered first and second secondary light is designed for providing an electrical output signal for an evaluation unit, which may be designed to evaluate the determined intensities of the filtered first and second secondary light, and to determine the mechanical quantity from the intensities. An evaluation may be achieved by generating the sum, the average, the sum with weighting of the intensities, the average with weighting of the intensities, or in another appropriate manner.

FIG. 1 illustrates a sensor, or a sensor device 303, integrated into an optical fiber, which has a fiber Bragg grating 306. Although only one single fiber Bragg grating 306 is shown in FIG. 1, it is suggested that the present invention is not limited to data collection from one single fiber Bragg grating 306, rather a plurality of fiber Bragg gratings 306 may be arranged along a transmission fiber or sensor fiber 304.

FIG. 1 therefore shows only a section of an optical fiber in the form sensor fiber 304, wherein this sensor fiber 304 is sensitive to a fiber elongation 308. It should be noted that the word "optic", or "light", refers to a wavelength range in the electromagnetic spectrum, which may extend from the ultraviolet spectral range, through the visible spectral range, to the infrared spectral range. A center wavelength of the fiber Bragg grating 306, that is the so-named Bragg wavelength $\lambda_B$, is obtained by the following equation:

$$\lambda_B = 2 \cdot n_k \cdot \Lambda$$

wherein $n_k$ is the effective refractive index of the basic mode in the core of the sensor fiber 304, and $\Lambda$ is the spatial grating period (modulation period) of the fiber Bragg grating 306.

A spectral width, given by the half-value width of the reflection response, depends on the elongation of the fiber Bragg grating 306 along the sensor fiber 304. The light propagation within the sensor fiber 304 is, through the effects of the fiber Bragg grating 306, thus dependent on forces, moments and mechanical loads, as well as temperatures, which are applied to the sensor fiber 304 and particularly the fiber Bragg grating 306 within the sensor fiber 304.

As shown in FIG. 1, measurement light 204 enters the sensor fiber 304 from the left, wherein a portion of the measurement light 204 exits as transmitted light 206 with modified wavelength characteristics compared to measurement light 204. Further, it is possible to receive reflected light 205 at the entry end of the fiber (that is, at the end which the measurement light 204 is also irradiated), wherein the reflected light 204 also has a modified wavelength distribution as illustrated, for example, in FIG. 2 (sensor reflection response).

Figure 2:
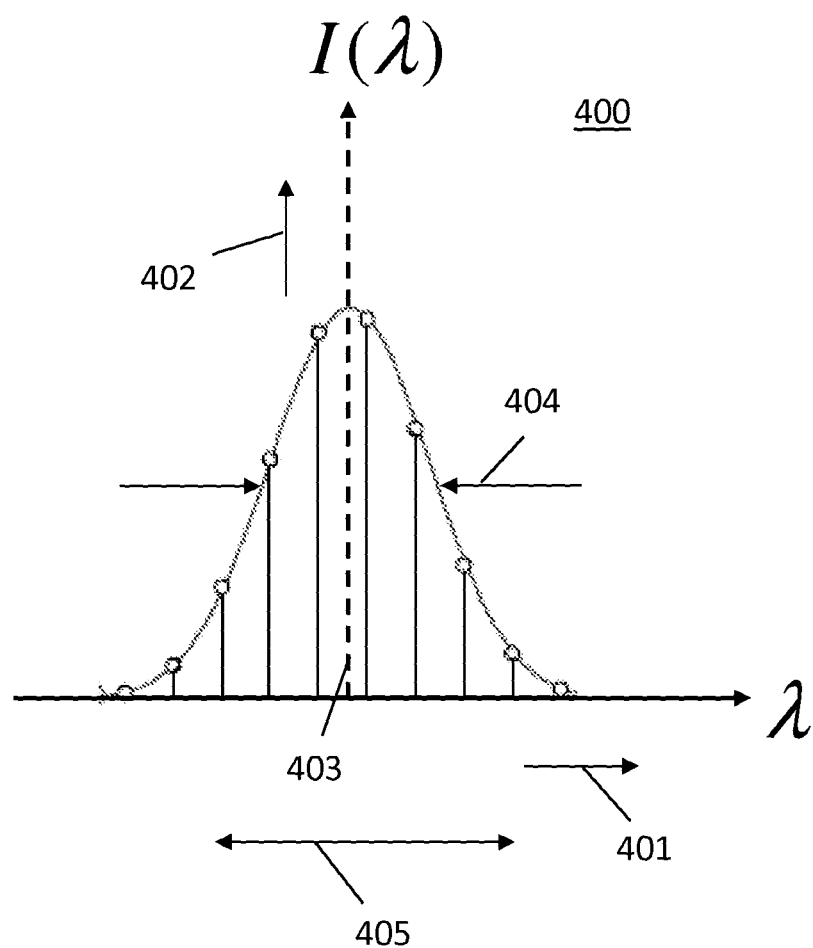
FIG. 2 shows a sensor reflection response, which is generated by an integrated sensor element within the fiber as shown in FIG. 1.

In one case, where the measurement light 204 is irradiated in a broad spectral range, a transmission minimum in the transmitted light 206 is produced at the Bragg wavelength point (in comparison to an inversion of the curve shown in FIG. 2, that is maximum absorption at the Bragg wavelength). At this point, a reflection maximum in the reflected light is produced, which is exemplified below in reference to FIG. 2.

FIG. 2 systematically illustrates a sensor reflection response 400, which is received when broadband measurement light 204 is irradiated, and where the center wavelength of the fiber Bragg grating 306 (FIG. 1), that is the Bragg wavelength $\lambda_B$, corresponds with the dashed line 403. The sensor reflection response 400 may have a curve symmetric in reference to the center wavelength 403, wherein the curve has a half-value width 404 (FWHM, or Full Width at Half Maximum), that is a spectral width at half of the maximum intensity.

In FIG. 2, spatial scanning points (circles) are hereby schematically identified. By evaluating the modified secondary light 203 inputted to the detector unit 104, it is hence possible to obtain a curve as shown in FIG. 2, that is the sensor reflection response 400 as a function of wavelength λ. In FIG. 2, an intensity distribution I(λ), that is the intensity reflected from sensor element 303, is illustrated as a function of wavelength λ. A wavelength distribution, determined by the measurement apparatus, is produced through a wavelength response area 405, illustrated by the double arrow in FIG. 2. In this range, modified secondary light 203 has wavelength components when the fiber Bragg grating 306 is measured. The modified secondary light 203 thus equates to the sensor reflection response 400 illustrated in FIG. 2, that is, a reflection intensity 402 is received as a function of wavelength 401.

Figure 3:
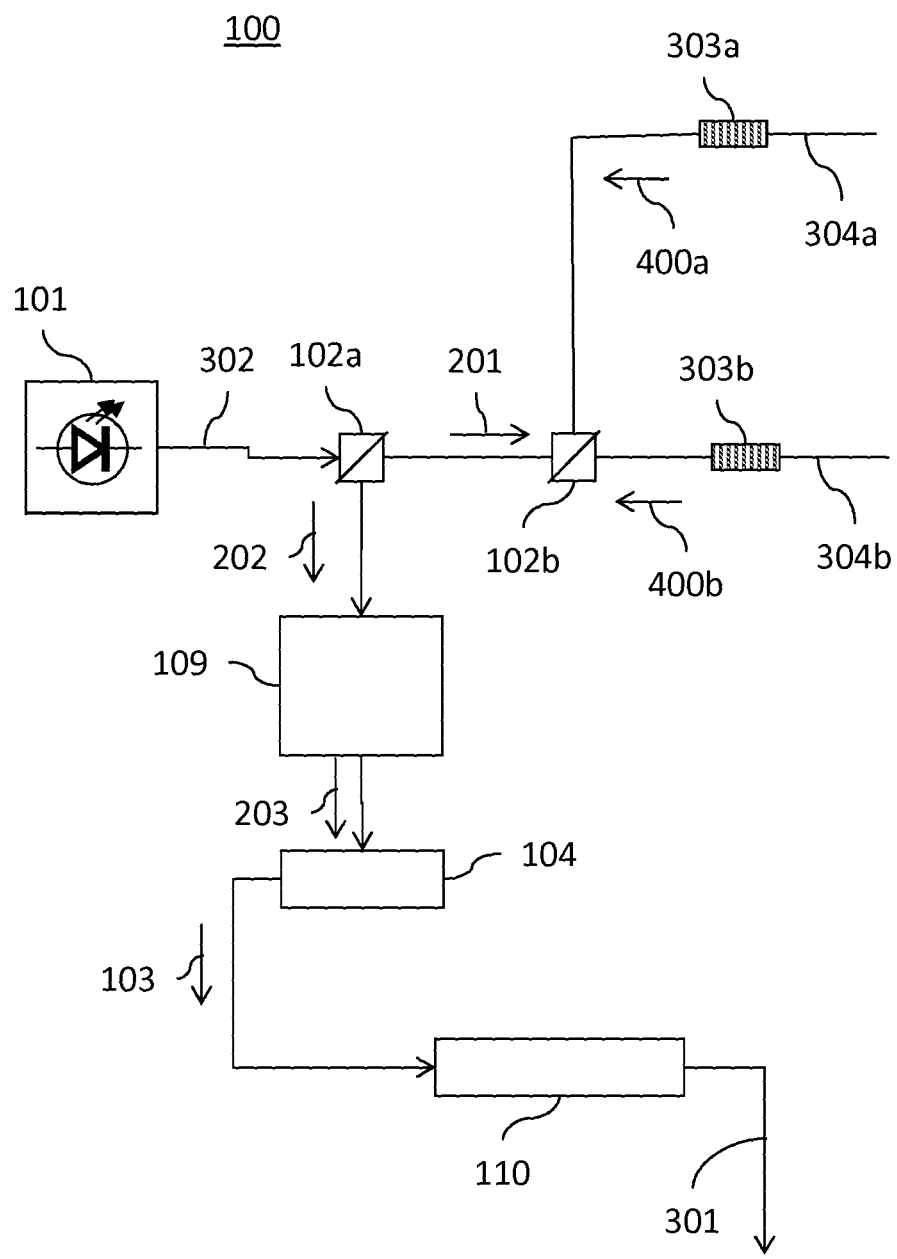
FIG. 3 shows a schematic block diagram of a fiber optic measurement apparatus with light source, fiber coupler and detection arrangement, according to one exemplary embodiment.

FIG. 3 shows a systematic block diagram of a temperature-compensated fiber optic measurement apparatus according to one embodiment. The fiber optic measurement apparatus shown in FIG. 3 is designed for determining at least one load to be measured. The fiber optic measurement apparatus 100 has a primary light source 101 for providing optical radiation, with which at least two optical sensor elements 303a, 303b may be irradiated.

For this purpose, an optical transmission fiber 302 is provided between the primary light source 101 and a first fiber coupler 102a. Primary light 201 exits fiber coupler 102a and is directed to a second fiber coupler 102b, which directs the primary light 201 to a first sensor fiber 304a, which contains the first sensor element 303a, and to a second sensor fiber 304b, which contains the second sensor element 303b. The sensor reflection responses 400a, 400b returned from sensor elements 303a, 303b depending on an applied load are guided back to the second fiber coupler 102b and directed to the first fiber coupler 102a. In the first fiber coupler 102a, a portion of the returned light is directed to a filter device 109 as secondary light 202. In other words, the sensor reflection responses 400a, 400b, which may have different central wavelengths, are provided by secondary light 202 as optical input signals to the filter device 109.

In the filter device 109, a filtering of the input signal wavelengths occurs, as explained in more detail below with reference to FIG. 4. Filtered secondary light 203 is ultimately output from filter device 109 and directed to a detection device 104, which may have detectors assigned to the first and second sensor reflection responses 400a, 400b (see below, described with reference to FIG. 4). Where necessary, a detector may also detect the sum of the intensities of the reflection responses. Here, the signals of the at least two sensors are superimposed. The electrical output signal 103 is ultimately directed to an evaluation unit 110, which is connected to the detection device 104 under normal operating conditions. In the evaluation unit 110, a calculation is performed based on the two signals based on the two sensor reflection responses 400a, 400b in such a way that a temperature compensation, to be exemplified below with reference to FIG. 5, takes place. A temperature-compensated output signal 301 is ultimately provided by the evaluation unit 110 after an evaluation of the electrical output signals 103 from the detection device 104. Typically, another compensation may also be performed, for example a compensation of moments or other effects, wherein through the arrangement a common-mode rejection occurs in an evaluated signal, i.e. influences which affect both fiber Bragg gratings similarly are suppressed by the filtering according to the embodiments described here.

Here, it should be noted that, although the operation of two optical sensor elements 303a, 303b is shown, three or more optical sensor elements may be operated in order to, for example, increase the measurement accuracy. The primary light intensity may be modulated by the primary light source 101 prior to irradiating the optical sensor elements 303a, 303b in order to, for example, eliminate or at least minimize undesired disturbances by use of a lock-in amplifier. By modulating the intensity of the primary light 201 through primary light source 101, the modulation frequency of the detection device 104 may be provided, in order to achieve a synchronized detection in the detection device 104.

As show in FIG. 3, the second fiber coupler 102b serves to distribute the primary light 202 to the two sensor fibers 304a, 304b, which each contain the optical sensor elements 303a, 303b, respectively. The reflected light, i.e. the sensor reflection responses 400a or 400b, is also coupled back through the second fiber coupler 102b. The filter device 109 schematically illustrated in FIG. 3 is designed as an optical filter device, comprising an optical filter. The optical filter may be selected from a group, which contains a thin film filter, a fiber Bragg grating, an LPG (long period grating), an arrayed waveguide grating (AWG), an echelle grating, a grating arrangement, a prism, an interferometer, and any combination thereof.

It should be further noted that, although a measurement in reflection is illustrated in FIG. 3, the optical sensor elements 303a, 303b designed as fiber Bragg gratings, may also be operated in transmission in such a way that transmitted primary light 201 is directed to the optical filter device 109 as a secondary light (transmitted secondary light).

Figure 4:
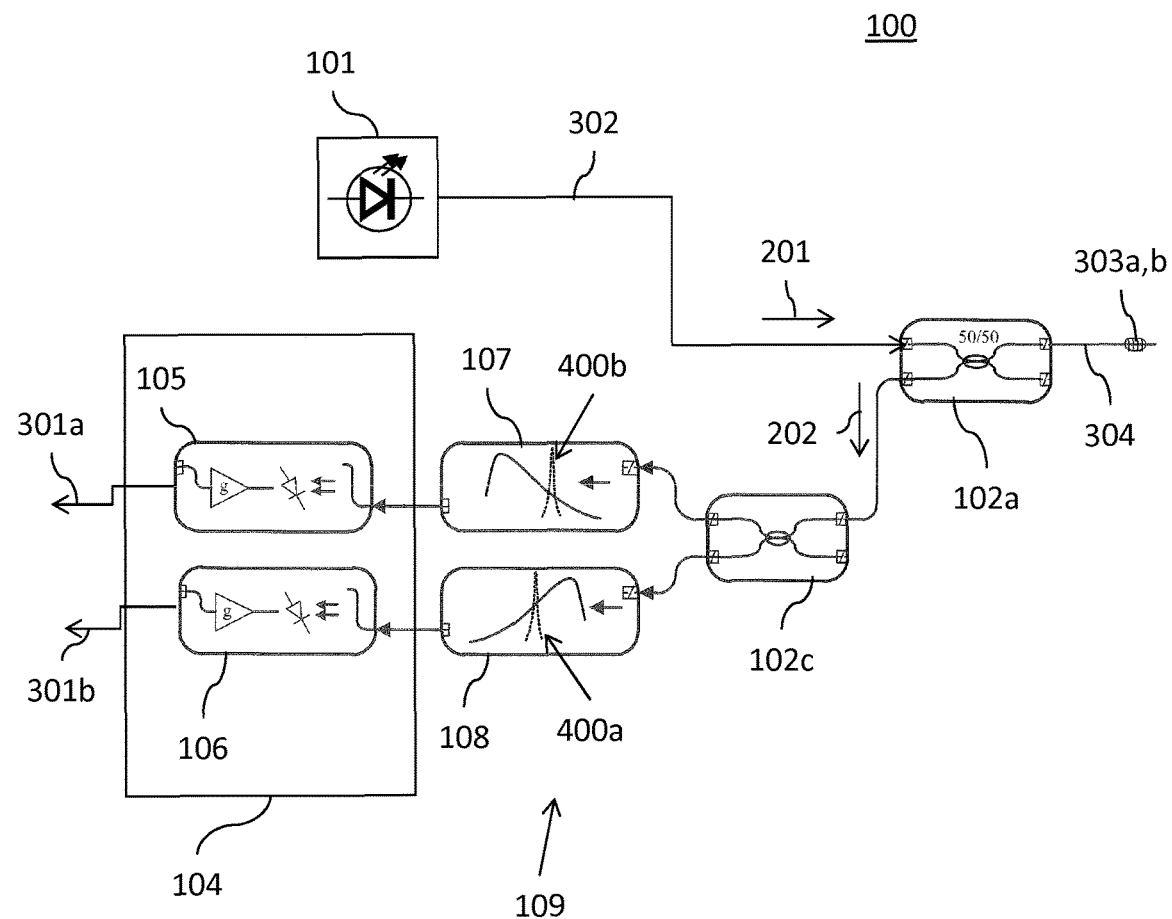
FIG. 4 shows a block diagram of a temperature-compensated fiber optic measurement system according to a further exemplary embodiment.

FIG. 4 shows a detailed block diagram of the temperature-compensated fiber optic measurement apparatus according to another embodiment. Here, it should be noted that components already described with reference to FIG. 3 will here not be mentioned again, to avoid redundant description. The primary light source 101 is coupled to the beam splitter 102a over a transmission fiber 302 in such a way that the primary light 201 output from the primary light source 101 may be directed to an optical sensor element 303. The optical sensor element is integrated in a sensor fiber 304. Although only one optical sensor element 303 is shown here, it is suggested that the evaluation arrangement shown in FIG. 4 is designed for at least two optical sensor elements, in such a way that two fiber Bragg grating signals may be detected on various filter gradients of an optical filter device 109.

The reflected light from the optical sensor elements 303 (illustrated in FIG. 4 as only one optical sensor element) is again conducted over the fiber coupler 102a to a fiber coupler 102c, which may direct the light to separate detectors, i.e. a first detector 105 and a second detector 106, over separate filter gradients 107, 108. In FIG. 4, two filter gradients are schematically shown, i.e. a falling filter gradient 107 and a rising filter gradient 108, which are provided by one or more optical filters arranged in the filter device 109. For example, the filter gradients may be provided by a filter which, on the one hand, filters in transmission, and on the other hand, filters in reflection. According to one embodiment, which may be combined with other embodiments described herein, the optical filter 109 may be designed as an edge filter device. The two separate detectors 105, 106 hence allow for directing separate electrical output signals 103a, 103b to an evaluation unit 110 (not shown in FIG. 4, see FIG. 3), in which the two electrical output signals 103a, 103b may be compared to each other.

The fiber coupler 102c may be designed in such a way that the inputted secondary light 202 is equally distributed between the falling filter gradient 107 and the rising filter gradient 108. According to other embodiments, instead of a fiber coupling, another arrangement may be used. For example, a beam splitter connected to a filter element may be used, wherein a filter gradient in transmission of a filter element and a filter gradient in reflection of a filter element are provided. The attached detectors, i.e. the first detector 105 which measures the signal from the falling filter gradient 107 and the second detector 106 which measures the signal from the rising filter gradient 108, output corresponding electrical output signals 103a, 103b from which the intensities of those portions of secondary light 202 correspond to the optical filtering in the optical filter 109 provided in the optical filter device 109.

Through the optical and electrical arrangement shown in FIG. 4, a non-differential measurement system based on fiber Bragg grating sensors is provided. When at least two fiber Bragg grating sensors are affected by an equal measure with a quantity A and affected by a unequal measure with a quantity B, the differential evaluation of the fiber Bragg grating signals, i.e. the sensor reflection responses 400a, 400b, in the fiber optic measurement system is made possible by evaluating the spectral reflection signals of both sensors keeping one measure for the quantity B, wherein the effect of quantity A on both sensors is compensated or at least partially compensated.

The differential measurement method for edge filter-based fiber optic measurement systems is particularly suitable. In other words, the presented fiber optic measurement apparatus is advantageous compared to a measurement apparatus, which determines the reflection signals from two fiber Bragg grating sensors using a spectral resolution method. The center frequencies of the fiber Bragg grating sensors are sufficiently spectrally separated from one another. Both sensors are, for example, exposed to the same temperature, however a sensor is thereby mechanically decoupled from every other effect.

The fiber optic measurement system illustrated in FIG. 4 provides a compensation, for example a temperature compensation, based on an edge filter-based evaluation. From the two so-called measured light intensities, the wavelength of the light reflected from the sensor may be concluded by use of linearized characteristic curves or polynomial evaluation of an arbitrary characteristic curve. The electrical output signal of the photo detectors may be electrically filtered with a low-pass filter before sensing the signal. This allows for implementing an anti-aliasing filter. In the optical filter device 109 shown in FIG. 4, a spectral filter is used, which has a symmetrical, (quasi-linear) filter characteristic respective to the central wavelength. Such a filter characteristic may be realized by a plurality of filter arrangements. The optical sensor elements 303a, 303b are realized as two fiber Bragg grating sensors connected in series in an optical sensor fiber 304.

According to further embodiments, the first sensor element 303a and the second sensor element 303b, for example each a fiber Bragg grating, are mounted in series in an optic fiber. The sum of the two reflection responses may be filtered in a single fiber by a filter arrangement with at least one filter, wherein the filter arrangement has a rising and a falling gradient, and detected by a detector after filtering. Here, an evaluation is provided by a superposition of both intensities of the two reflection responses (or transmission responses), i.e. a summation. An elongation applied to the entire fiber and operating in equal measure on both sensor elements results in a shift of the peak of the fiber Bragg grating, wherein however the superposition remains substantially constant. Therefore, a common-mode rejection occurs, as with other embodiments. Additionally, with an equal warming at the site of the sensor elements, an analog compensation takes place, wherein the superposition of both intensities of the reflection responses (or transmission responses) remain substantially constant.

According to typical embodiments, the rising gradient of the filtering and the falling flank of the filtering is arranged symmetrically. Further, the signal peaks of the reflection responses may hereby be arranged spectrally symmetrically. Thus, a synchronized spectral shift of the reflection responses results in a substantially constant sum signal. Effects, moments and environmental fluctuations which operate on both sensor elements equally may thus be passively compensated. A change in the evaluated measurement signal results from a shift.

An embodiment with both sensor elements in a fiber, whose output signals, i.e. the reflection signals or transmission signals, are directed to a filter arrangement and ultimately to a detector, demonstrates a particularly simple arrangement, and hence a cost-effective arrangement. Hereby, evaluation is achieved through a superposition, i.e. summation, of the intensities at the detector. Further, optical aberrations have an equal effect on both signals, as a single fiber is used. Other embodiments, in which the signals of two sensor elements in a single fiber are separately filtered and detected, or in which the signals of two sensor elements in a respective fiber are separately filtered and detected, are more complex in construction, but by numerical evaluation may provide higher flexibility when necessary.

Figure 5:
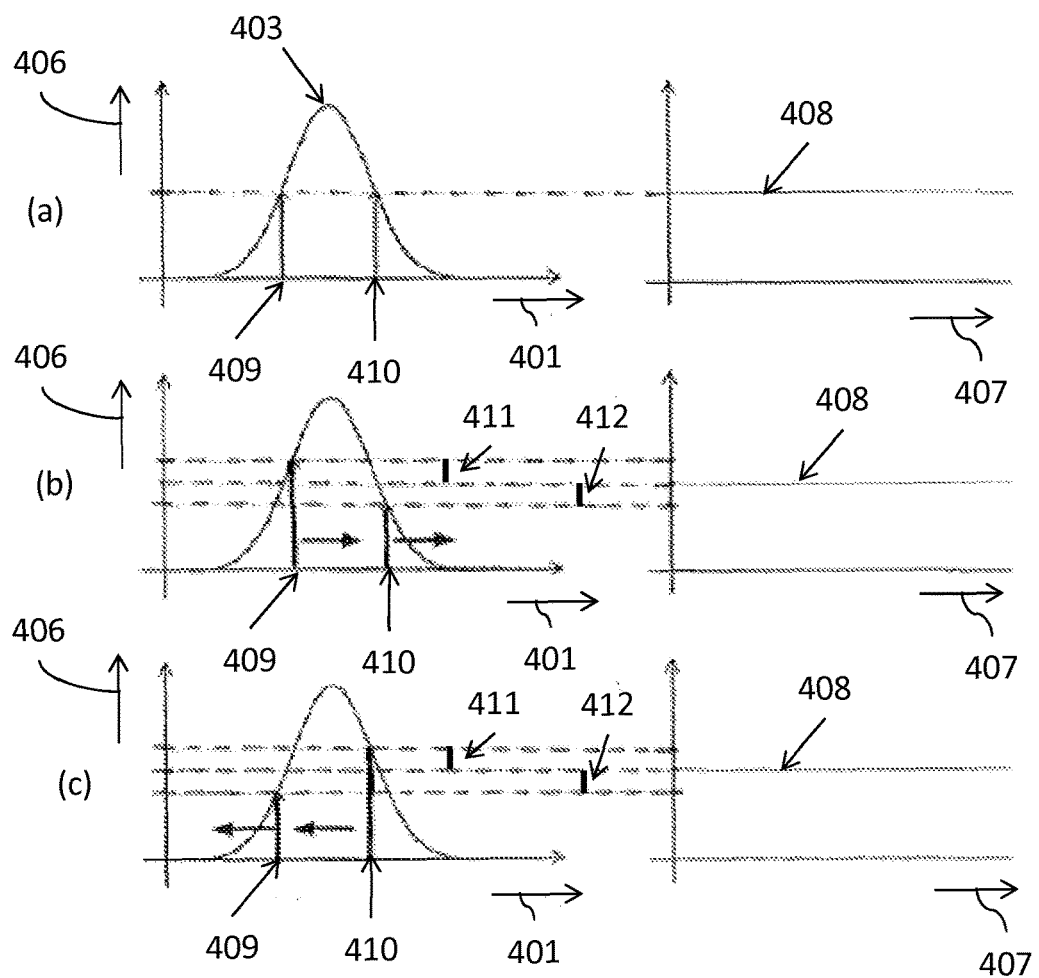
FIG. 5 shows filter transmission curves as a function of wavelength and the obtained signal amplitude for various load cases, combined in filter diagrams, according to another further exemplary embodiment.

FIG. 5 is a graph for visualizing a filter function provided by the optical filter device 109. The center wavelength of the optical sensor elements 303a, 303b, designed as fiber Bragg gratings, are adjusted so that these have reflection maxima symmetrical about a center wavelength of the optical filter. The optical sensor elements 303a, 303b are further designed in a way that they are affected equally by a quantity A, but not affected equally by a quantity B.

For example, both optical sensor elements 303a, 303b have an equal temperature T (quantity A) applied to them. A change in temperature T effects an equal shift of both center wavelengths (fiber Bragg grating reflection maxima) in spectrum. Due to the symmetrical, quasi-linear filter curves of the filters, the light power of an optical element 303a incident on the detector is reduced, while the light power reflected from another optical sensor 303b is correspondingly increased. Thus, a change in temperature of both fiber Bragg grating sensors, through the uniform spectral shift as shown in FIG. 5, Graph (b) and Graph (c), results in no change in measured sum output signal. The filter-based measurement method according to the present exemplary embodiment determines wavelength changes as changes in the measured light intensity, so that no output signal change occurs with a uniform influence of quantity A.

The measurement method according to the described exemplary embodiment compensates not only for uniform wavelength changes in the fiber Bragg grating sensor, but also changes in center wavelength of the spectra filter. One cause for a shift in the center wavelength of the optical filter may be temperature changes in the measurement system itself. Depending on the technical design of the filter, drift in the region of tens of pm/K may occur. With the symmetrical arrangement of the fiber Bragg grating sensors and the symmetrical form of the filter as described above, it is possible to determine the measured intensity signal independent of any shift of filter characteristics in a defined range.

Changes in quantity B, which does not affect both sensors equally (given by the overall construction of the fiber optic measurement apparatus), thus effect an effective intensity change at the detector, whereby a wavelength change is detectable in a data processing of the measurement system. According to a preferred embodiment, which may be combined with other embodiments described herein, the arrangement of the measurement system is such that a second optical sensor element 303b (FBG2) is affected by the environmental temperature and simultaneously by the prevailing elongation at the sensor location, while a first optical sensor element 303a (FBG1) is mechanically decoupled and is hence only affected by the environmental temperature, and not by the material elongation at the sensor. In this case, the fiber optic measurement system may, for example, compensate with consideration of:

shifting of the central wavelength of the filter of the measurement system, for example through thermal effects; and uniform wavelength changes of both optical sensor elements (FBG sensors), for example due to temperature changes at the location of both sensors.

As shown in FIG. 5, a filter transmission 406 of a provided optical filter with a half width 404 has a specified symmetry such that rising and falling filter gradients exist. In FIG. 5, for three different cases (a), (b) and (c), corresponding filter transmissions 406 are plotted as a function of a wavelength 401. The term "center wavelength" as used above refers to the maximum of the filter transmission curve. The center wavelength or middle wavelength 403 corresponds to those wavelengths at the location of maximum filter transmission. Middle wavelengths of the sensor elements 303a, 303b in the form of fiber Bragg grating sensors are adjusted in such a way that a first Bragg wavelength 409 lies in a range of the rising filter gradient, and further, that a second Bragg wavelength 410 lies in a region of falling filter gradient.

A signal amplitude 408 as a function of a measurement time 407 is specified by the dashed line shown in FIG. 5(a). The two optical signals, when added together, contribute equally to the signal amplitude 408. When a uniform shift of both Bragg wavelengths, i.e. the first Bragg wavelength 409 and the second Bragg wavelength 410, occurs, for example through a uniform application of quantity A to both optical sensor elements 303a, 303b, both Bragg wavelengths, as shown in FIG. 5(b), may be increased. In this case, in the first detector 105, which is dedicated to the first Bragg wavelength 409, a signal amplitude raised by a first transmissions difference 411 is detected, while in the second detector 106, which is dedicated to the second Bragg wavelength 410, a signal amplitude lowered by a second transmission difference 412 is detected.

For symmetrical filter gradients, particularly for nearly-linear rising or falling filter gradients of the optical filter device 109, the first transmission difference 411 equates to the second transmission difference 412. In other words, the overall detected signal amplitude of both detectors 105, 106 remains unchanged when both fiber Bragg grating sensors are applied with the same quantity A, so that a wavelength shift to higher wavelengths occurs, as shown in FIG. 5(b), or a shift of both Bragg wavelengths of both optical sensor elements 303a, 303b to lower wavelengths occurs, as illustrated in FIG. 5(c).

An evaluation of the determined intensities of the filtered first and second secondary light may determine, according to one embodiment, which may be combined with other embodiments described herein, a sum and/or difference generation of the intensity of the first secondary light and the intensity of the second secondary light, to obtain a resulting signal amplitude 108.

According to another embodiment, the optical filter device 109 has an optical filter with symmetrical filter gradients. Here, the optical sensor elements 303a, 303b, which may be designed as fiber Bragg grating sensors, are configured in such a way that the first Bragg wavelength 409 lies in the range of the rising filter gradient, while the second Bragg wavelength 410 lies in the range of the falling filter gradient. When the optical filter device has symmetrical rising and falling filter gradients, good compensation of quantities which equally affect both optical sensor elements 303a, 303b, such as, for example, a change in temperature, is achieved. The filter characteristics of the filter device 109 may have one or more of the following properties:

i. quasi-linear filter characteristics;
ii. triangular-shaped filter gradients; and
iii. symmetrical filter gradients.

With symmetrical filter gradients, it is possible that the first and second secondary light 202 modified by the mechanical quantity are optically symmetrically filtered on symmetrical rising and falling filter gradients. According to one embodiment, a spectral sum signal of the at least two sensors (for example 2, 4, or 2*n sensors, wherein n is an integer) is directed to two filter gradients, provided by a filter in transmission and reflection or by two filters. An optical filter device 109 may also have two separate optical filter devices, corresponding to the fiber Bragg gratings and arranged in the separate sensor fibers 304a, 304b, with filter gradients 107, 108 of different slope. Consequently, there is the advantage that with a uniform application on both optical sensor elements 303a, 303b, an improved compensation with regard to disturbances is made possible, which equally affect the Bragg wavelengths 409, 410 of both optical sensor elements 303a, 303b.

Figure 6:
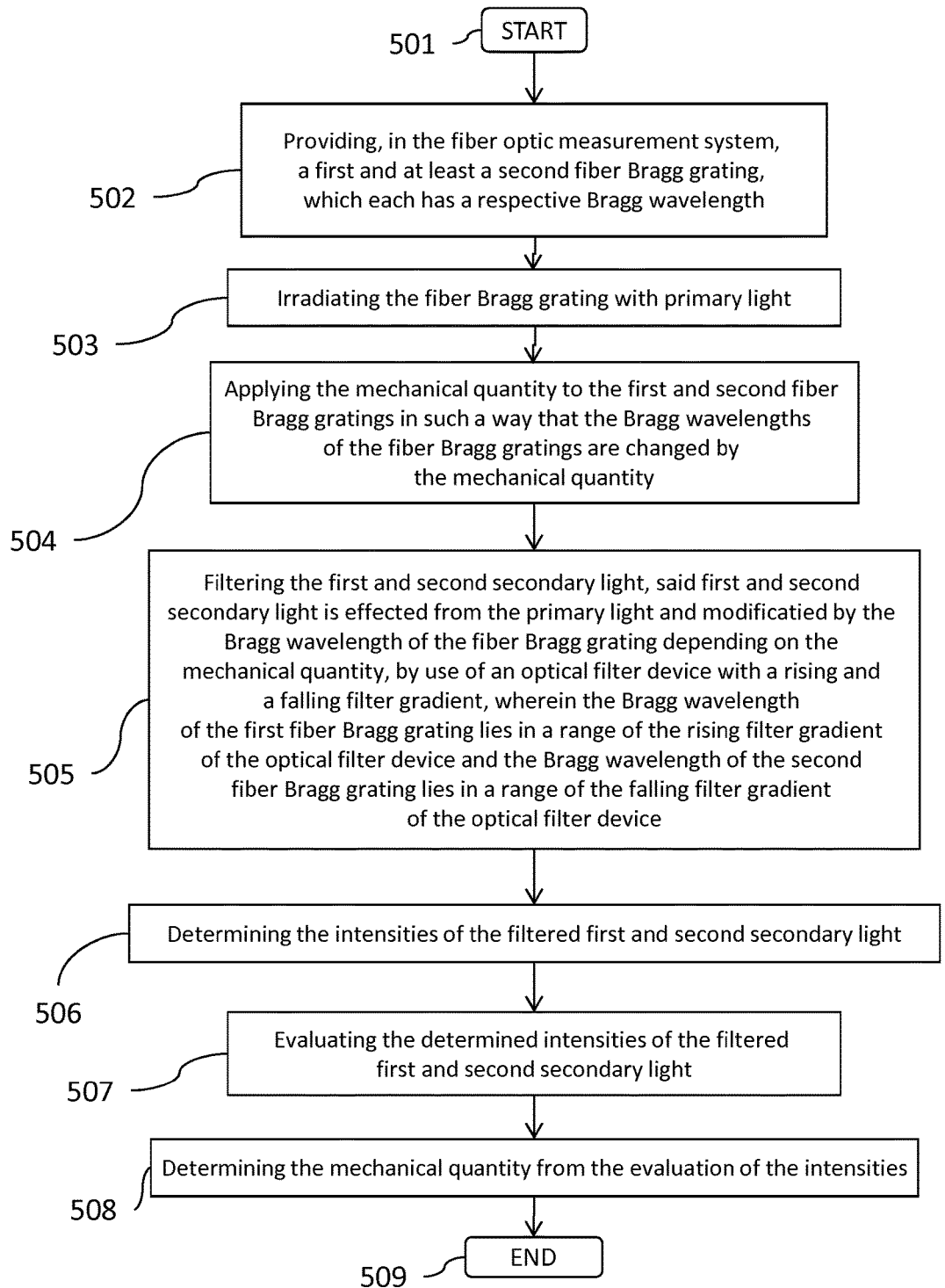
FIG. 6 shows a flow diagram for visualizing a method for temperature compensation of a fiber optic measurement system designed to determine a mechanical quantity, according to another further exemplary embodiment.

FIG. 6 is a flow diagram which illustrates a method for temperature compensation of a fiber optic measurement system designed to determine a mechanical quantity. After starting in block 501, in a following block a first and at least a second fiber Bragg grating 306 are provided as first and second optical sensor element 303a, 303b in the fiber optic measurement system. The fiber Bragg grating 306 has different respective Bragg wavelengths 409, 410. Subsequently, the fiber Bragg grating is irradiated by primary light 201 (block 503). When the first and second fiber Bragg gratings are now subjected to the mechanical quality (block 504), a change in the Bragg wavelengths 409, 410 of the fiber Bragg grating 306 is produced according to the mechanical quantity.

In the block 505, the first and second secondary light 202, said secondary light 202 resulting from modification of the Bragg wavelengths 409, 410 of the provided primary light depending on the mechanical quantity acting on the fiber Bragg grating, are filtered by use of an optical filter device 109. The optical filter device 109 has a rising and a falling filter gradient 108, 107. The Bragg wavelength 409 of the first fiber Bragg grating 303a lies in the region of the rising filter gradient 108 of the optical filter device 109, while the Bragg wavelength 410 of the second fiber Bragg grating 303b lies in the lies in the region of the falling filter gradient 107 of the optical filter device 109. Subsequently, in a block 506 the intensities of the filtered first and second secondary light 202 are determined. An evaluation, for example a summation, of the determined intensities of the filtered first and second secondary light 202 is performed (block 507), whereupon the mechanical quantity is determined from the intensities (block 508). The procedure concludes in block 509.

The disturbance compensation for a fiber optic measurement system allows for providing, for example, improved acceleration sensors with reduced sensitivity to lateral acceleration. A further example application is a temperature-compensated strain gauge, as well as a strain gauge with compensated sensitivity to shear strain. Hereby, effects such as temperature effects on the sensor or other effects on the sensor may be compensated.

Although the present invention has been described above with reference to typical embodiments, it is not limited thereto, but may be modified in a variety of ways. The invention is also not limited to these possible applications.

The invention claimed is:

1. Method for compensating a fiber optic measurement system designed to determine a mechanical quantity, comprising:
    providing, in the fiber optic measuring system, a first and at least a second fiber Bragg grating, which have a respective Bragg wavelength;
    irradiating the fiber Bragg grating with primary light;
    application to the first and second fiber Bragg grating of the mechanical quantity in such a way that the Bragg wavelength of the fiber Bragg grating is changed by the mechanical quantity, wherein the first and at least second fiber Bragg gratings are affected substantially equally by a disturbance quantity A and affected differently by the mechanical quantity;
    filtering the first and second secondary light, said first and second secondary light is effected from the primary light and modified by the Bragg wavelength of the fiber Bragg grating depending on the mechanical quantity, by use of an optical filter device with a rising and a falling filter gradient, wherein
    the Bragg wavelength of the first fiber Bragg grating, in a state in which the first fiber Bragg grating is unaffected by the mechanical quantity, lies in a range of the rising filter gradient of the optical filter device and the Bragg wavelength of the second fiber Bragg grating, in a state in which the second fiber Bragg grating is unaffected by the mechanical quantity, lies in a range of the falling filter gradient of the optical filter device;
    determining the intensities of the filtered first and second secondary light;
    evaluating the determined intensities of the filtered first and second secondary light, wherein the evaluation of the determined intensities of the filtered first and second secondary light comprises a summation of the intensity of the first secondary light and the intensity of the second secondary light; and
    determining the mechanical quantity from the intensity evaluation.

2. Method according to claim 1, wherein the first and second secondary light modified by the mechanical quantity is optically filtered on symmetrical rising and falling filter gradients.

3. Method according to claim 1, wherein the determined intensities are summated mathematically or by the detection.

4. Method according to claim 1, wherein the determined intensities are summated mathematically or by the detection, wherein an average is calculated.

5. Method according to claim 4, wherein a weighted average is performed.

6. Method according to claim 1, wherein the primary light is intensity modulated before irradiation of the fiber Bragg grating.

7. Method according to claim 1, wherein a spectral summation signal for the first fiber Bragg grating and the at least second fiber Bragg grating is used.

8. Fiber optic measurement apparatus for compensated determination of a mechanical quantity, comprising:
    a first and at least a second fiber Bragg grating, each having a respective Bragg wavelength dependent on the applied mechanical quantity, wherein the first and at least second fiber Bragg gratings are arranged to be affected substantially equally by a disturbance quantity A and affected differently by the mechanical quantity;
    a primary light source for irradiating the fiber Bragg grating with primary light;
    an optical filter device for filtering the first and second secondary light outputted from the fiber Bragg gratings, said first and second secondary light is effected from the primary light and modified by the Bragg wavelength, wherein
    the optical filter device has at least one rising and at least one falling filter gradient, and wherein
    the Bragg wavelength of the first fiber Bragg grating, in a state in which the first fiber Bragg grating is unaffected by the mechanical quantity, lies in a range of the rising filter gradient of the optical filter device and the Bragg wavelength of the second fiber Bragg grating, in a state in which the second fiber Bragg grating is unaffected by the mechanical quantity, lies in a range of the falling filter gradient of the optical filter device; and
    an optical detection device for determining the intensities of the filtered first and second secondary light; and
    an evaluation unit for evaluating the determined intensities of the filtered first and second secondary light and for determining the mechanical quantity from the intensity evaluation, wherein the evaluation unit and/or the optical detection device is adapted for summation of the intensity of the first secondary light and the intensity of the second secondary light.

9. Fiber optic measurement apparatus according to claim 8, wherein the optical filter device has symmetrical rising and falling filter gradients.

10. Fiber optic measurement apparatus according to claim 8, further comprising at least one arrangement adapted for distributing the secondary light outputted from the first and second fiber Bragg gratings to two separate optical axes or fiber strands.

11. Fiber optic measurement apparatus according to claim 9, further comprising at least one arrangement adapted for distributing the secondary light outputted from the first and second fiber Bragg gratings to two separate optical axes or fiber strands.

12. Fiber optic measurement apparatus according to claim 10, wherein the optical filter device has two separate optical filter devices corresponding to the fiber Bragg gratings and arranged in separate fiber strands with filter gradients of different slope.

13. Fiber optic measurement apparatus according to claim 8, wherein the optical filter device comprises an optical filter selected from a group consisting of a thin film filter, a fiber Bragg grating, an LPG, an arrayed waveguide grating (AWG), an Echelle grating, a grating arrangement, a prism, an interferometer, and any combination thereof.

14. Fiber optic measurement apparatus according to claim 10, wherein the optical detection device for determining the intensities of the filtered first and second secondary light has separate optical detectors dedicated to each fiber strand for the first and second filtered secondary light.

15. Fiber optic measurement apparatus according to claim 8, wherein a spectral summation signal of the first fiber Bragg grating and the at least second fiber Bragg grating is used.

\* \* \* \* \*